UNITED STATES PATENT OFFICE.

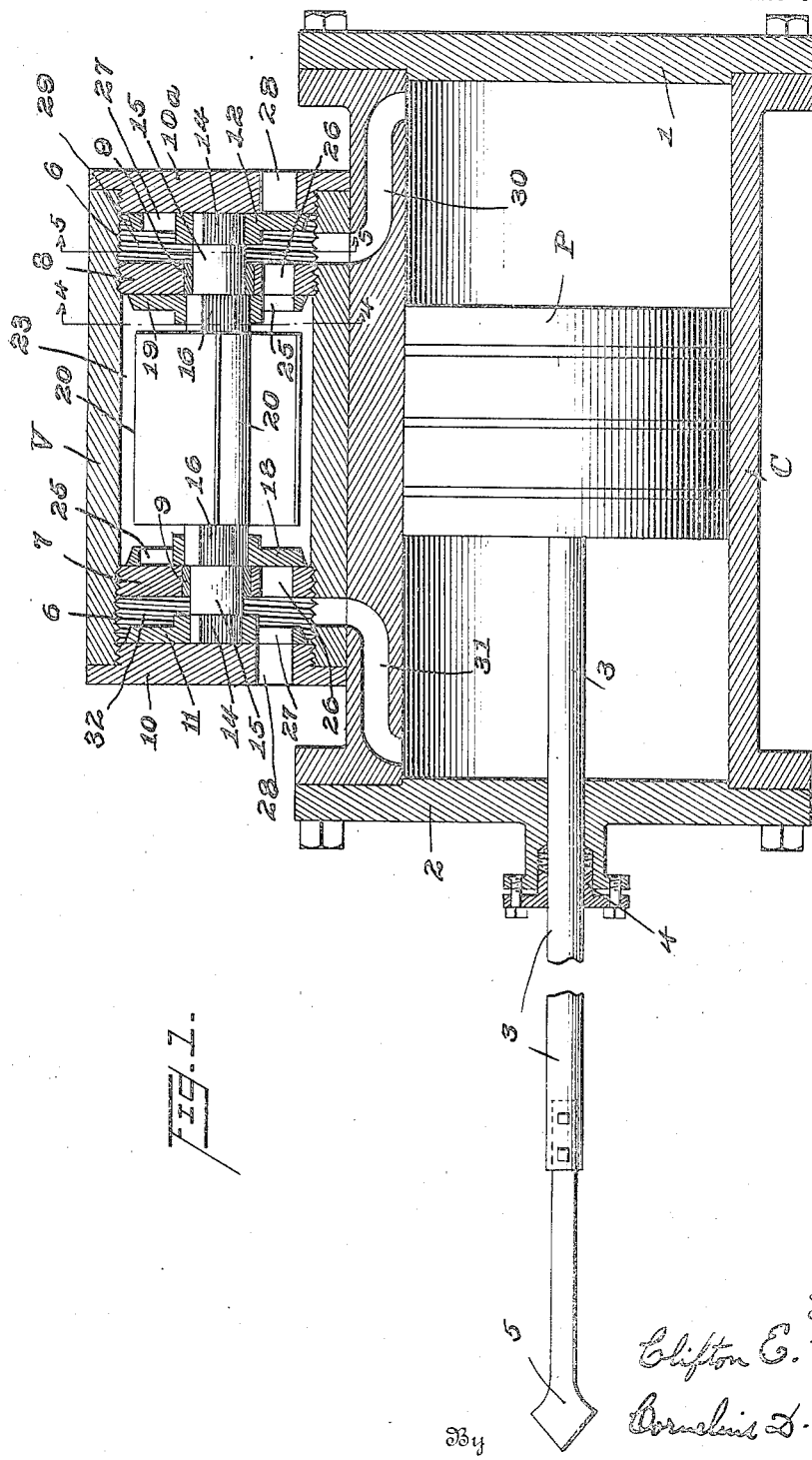

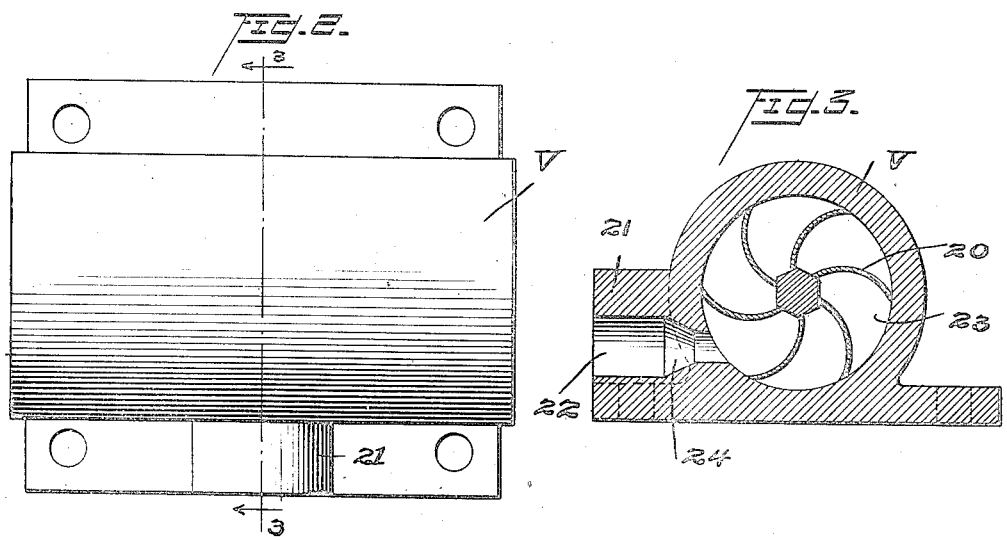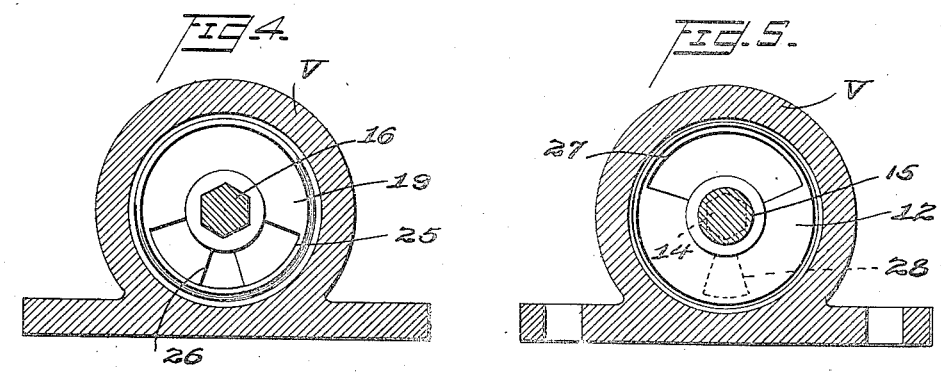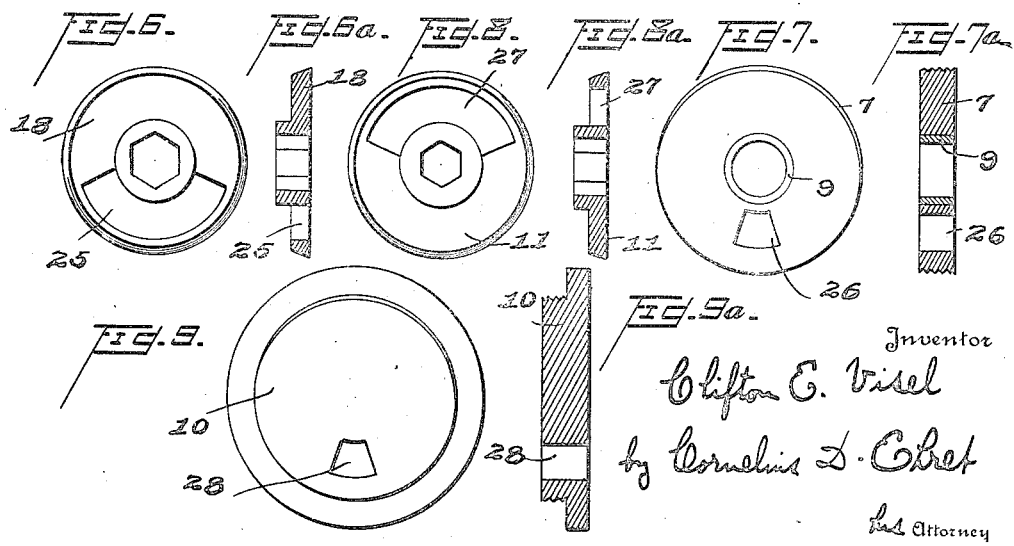

CLIFTON E. VISEL, OF NEW HAVEN, CONNECTICUT.

VALVE MECHANISM.

1,253,311.  Specification of Letters Patent.  Patented Jan. 15, 1918.

Application filed August 13, 1917. Serial No. 185,869.

*To all whom it may concern:*

Be it known that I, CLIFTON E. VISEL, a citizen of the United States, residing in the city of New Haven, county of New Haven, and State of Connecticut, have invented certain new and useful Improvements in Valve Mechanism, of which the following is a specification.

My invention relates to the combination with a motor, as of the reciprocating type, actuated by motive fluid, particularly elastic fluid such as steam or compressed air, of valve mechanism for controlling the motive fluid delivered to the motor, a motor actuating the valve mechanism independently of the first mentioned motor and itself actuated by the motive fluid which actuates the first named motor.

For an illustration of one of the forms my invention may take, reference is to be had to the accompanying drawings, in which:

Figure 1 is a longitudinal sectional view through one form of my valve mechanism and an associated cylinder.

Fig. 2 is a top plan view of the valve mechanism shown in Fig. 1.

Fig. 3 is a cross sectional view taken on the line 3—3 of Fig. 2.

Fig. 4 is a cross sectional view taken on the line 4—4 of Fig. 1.

Fig. 5 is a cross sectional view taken on the line 5—5 of Fig. 1.

Fig. 6 is a side elevational view of one of the rotary valve members.

Fig. 6ª is a sectional view of the member shown in Fig. 6.

Fig. 7 is a side elevational view of the valve seat member with which coöperates the valve member shown in Fig. 6.

Fig. 7ª is a sectional view of the member shown in Fig. 7.

Fig. 8 is a side elevational view of another of the valve members.

Fig. 8ª is a sectional view of the member shown in Fig. 8.

Fig. 9 is a side elevational view of an end closure of the valve chest and forming a seat with which coöperates the rotary valve member shown in Fig. 8.

Fig. 9ª is a sectional view of the member shown in Fig. 9.

Referring to the drawings, C is a cylinder having the heads 1 and 2 and within which reciprocates the piston P secured upon the piston rod 3 extending through the cylinder head 2 and the stuffing box 4 and carrying at its outer end any suitable instrument 5 which may be a drill, riveter or any other suitable device.

While the piston P is here shown connected to the rod 3 as described, it will be understood that the piston P may be the piston of a hammer type rock drill, wherein, as well understood in the art, the piston strikes at each forward stroke a hammer or member which in turn delivers a blow to the drill.

Upon the cylinder C is the valve mechanism contained within the valve chest V internally threaded at each end, as indicated at 6, 6. Threaded into the valve chest V are the similar circular valve seat members 7 and 8, each provided with a central hole in which is disposed a shaft bearing bushing 9.

Threaded into the valve chest V are the similar end closures or heads 10 and 11 operating also as valve seats for the coöperating similar rotating valve members 11 and 12 having central hexagonal openings 13 receiving the hexagonal ends 14 of the shaft 15 bearing in the aforementioned bushings 9, 9. The shaft 15 has the further hexagonal portions 16, 16 upon which are disposed the similar rotary valve members 18 and 19 having central hexagonal openings.

The valve members 11, 18, 19 and 12 are maintained in fixed angular relation with respect to the shaft 16, but are free to move slightly longitudinally upon the associated hexagonal portions of the shaft.

Secured upon the shaft 15 between the rotary valve members 18 and 19 is the fan, turbine or impulse wheel 20 rotatable within the central chamber 23 in the valve chest V, and constituting a motor for rotating the valve members. On the chest V is provided an extension or boss 21 provided with the opening 22, Fig. 3, with which connects a pipe, not shown, communicating with a supply of compressed air, steam or other elastic fluid under suitably high pressure. Between the opening 22 and the central chamber 23 of the valve chest is the restricted passage 24 forming in effect a nozzle which delivers the motive fluid into the chamber 23 against the vanes, blades or buckets of the motor element 20.

In the rotary valve members 18 and 19 are the ports 25, of any suitable angular extent and of any suitable radial depth. The valve members 18 and 19 are so disposed upon the shaft 15 that their ports 25, 25 are disposed at 180 degrees from each other.

In the valve seat members 7 and 8, coöperating with the valve members 18 and 19, respectively, are the suitably shaped ports 26, 26, with which the ports 25 are adapted to register.

In the rotary valve members 11 and 12 are the suitably shaped ports 27, 27, disposed at 180 degrees with respect to each other, and made of any suitable radial depth and of any suitable angular extent, and adapted to register with the exhaust ports 28, 28 in the valve chest head members 10 and 11.

To facilitate assembly of the structure when of the form described, the hexagonal portions 16 on the shaft 15 are of larger diameter than the hexagonal portions 14 on the ends of that shaft.

The operation is as follows:

The motive fluid under pressure is delivered through the passage 24 into the central chamber 23 in the valve chest V and impinges upon the blades, vanes or buckets of the rotary member or fan 20, rotating the same and thereby rotating the shaft 15 and the valve members 11, 18, 19 and 12, all rotating in unison.

In the position of the parts shown in Fig. 1 the motive fluid, after impinging upon the motor element 20, passes through the port 25 in the valve member 19 and through the port 26 in the valve seat member 8 into the end chamber 29 in the valve chest V and thence through the passage 30 into the right end of the cylinder C, forcing the piston P toward the left. Escape of motive fluid from the chamber 29 is prevented, because the port 27 in the valve member 12 is not in register with the exhaust port 28 in the member 11.

While the piston P is moving toward the left, motive fluid is expelled thereby from the left end of the cylinder C through the passage 31 into the end chamber 32 in the valve chest V, from which it escapes through the port 27 in the valve member 11, which port is now registering with the exhaust port 28 in the member 10.

Upon further revolution of the shaft 15 the port 25 in the valve member 19 is withdrawn from register with the port 26 in the valve seat member 8, thereby preventing passage of motive fluid into the chamber 29, but the port 25 in the valve member 18 comes into register with the port 26 in the member 7 allowing passage of motive fluid into the end chamber 32, from which it enters the cylinder C through the passage 31 to the end of the piston P, forcing the latter toward the right. Escape of motive fluid from the chamber 32 through the exhaust port 28 is prevented because the port 27 in the valve member 11 is now no longer in register with exhaust port 28 in member 10.

And as the piston P moves toward the right, it forces the fluid out of the right end of the cylinder C through the passage 30 into the end chamber 29, from which it escapes through the port 27 in the valve member 12, which is now in register with the exhaust port 28 in the member 11.

And so on, for each revolution of the shaft 15 the piston P makes a complete forward and return stroke, motive fluid being alternately admitted at opposite ends of the cylinder and exhausted through the opposite ends through the valve mechanism.

The pressure of the motive fluid within the central or motor chamber of valve chest V and in the end chambers 29 and 32 is sufficient for holding the rotary valve members in suitably close contact with their coöperating valve seat members, and to allow of such action the rotary valve members are loose longitudinally of the shaft as hereinbefore stated.

While in the example of my invention above described the motive fluid which actuates the piston also actuates the motor member 20, it will be understood that the valve members may be rotated by any suitable motor element operated by fluid other than that which enters the cylinder C, or by any other motor or means.

And where desirable the rotary valve members may be driven through suitable mechanical connections by and from the piston P, so that said valve members always rotate in predetermined time relation with respect to the piston.

Where the valve members are driven independently of definite relation with the piston P, they may be rotated at very high speed, causing very high speed operation of the piston P, which is desirable and suitable for rock drills, riveters and the like.

Where the piston P is required to do a greater amount of work when moving in one direction than in the other, as is the case with drills, riveters, etc., the ports 25 and 26 in the members 19 and 8, through which motive fluid is admitted to the cylinder C for moving the piston P toward the left when it is doing its greater amount of work, may be of larger area, or for a longer time in register with each other, or both, then in the case of the ports 25 and 26 in the members 18 and 7, whereby for the stroke toward the left more motive fluid is admitted into the cylinder than for the return stroke when the motive fluid is admitted to the left end of the cylinder C.

And it will be understood that my invention is not limited to the size and shape of the ports illustrated, but that they may be varied both as to area, time of register, etc., to suit circumstances.

What I claim is:

1. The combination with serially connected fluid operated motors, of valve mechanism driven by one of said motors independently of the other motor controlling delivery and exhaust of motive fluid to and from said other motor.

2. The combination with serially connected rotary and reciprocating motors, of valve mechanism actuated by said rotary motor controlling delivery and exhaust of motive fluid to and from said reciprocating motor.

3. The combination with a cylinder and a piston movable therein, of valve mechanism for controlling motive fluid therefor comprising coöperating valve members, and a motor driven by said motive fluid for causing relative movement of said valve members independently of said piston.

4. The combination with a cylinder and a piston movable therein, of valve mechanism for controlling the same comprising relatively rotatable valve members controlling motive fluid for said cylinder, and a motor driven by said motive fluid for causing relative rotation of said valve members independently of said cylinder.

5. The combination with a cylinder and a piston movable therein, of valve mechanism controlling the same comprising a valve chest, means for supplying motive fluid thereto, rotary valve members in said chest controlling admission of motive fluid to and exhaust of motive fluid from said cylinder, and a motor element in said valve chest driven by said motive fluid rotating said valve members independently of said piston.

6. The combination with a cylinder and a piston movable therein, of valve mechanism controlling the same comprising a valve chest, means dividing the same into chambers communicating with opposite ends of said cylinder, a motive fluid connection with said valve chest, rotary valve members therein controlling admission and exhaust of motive fluid into and from said chambers, and a motor element driven by said motive fluid rotating said valve members independently of said piston.

7. Valve mechanism comprising a valve chest, members having exhaust ports, rotary ported valve members coöperating therewith, means dividing said chest into chambers in which said valve members are located, another chamber, a motive fluid connection thereto, rotary valve members controlling communication between said chamber and said first named chambers, a shaft on which all of said valve members are secured, and a motor element secured upon said shaft and actuated by the fluid controlled by said valves.

8. Valve mechanism comprising a valve chest, members having exhaust ports, rotary ported valve members coöperating therewith, means dividing said chest into chambers in which said valve members are located, another chamber, a motive fluid connection thereto, rotary valve members controlling communication between said chamber and said first named chambers, a shaft on which all said valve members are secured, and a motor element secured upon said shaft and actuated by the fluid controlled by said valves, said valve members being held in fixed angular relation with respect to said shaft but movable longitudinally thereof, whereby the motive fluid holds said valve members against their coöperating members.

In testimony whereof I have hereunto affixed my signature this 8th day of August, 1917.

CLIFTON E. VISEL.